Dec. 6, 1960  L. C. ELDER  2,962,783
SPRING CLIP FOR CONNECTING TWO PARTS
Filed Feb. 19, 1958
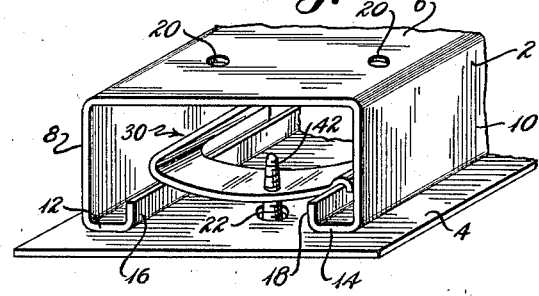
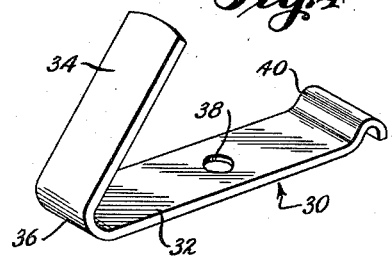
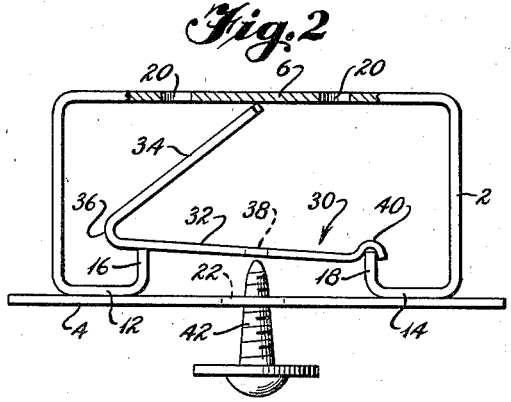
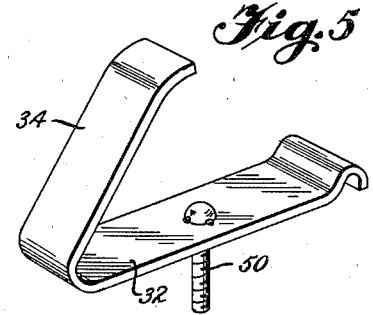
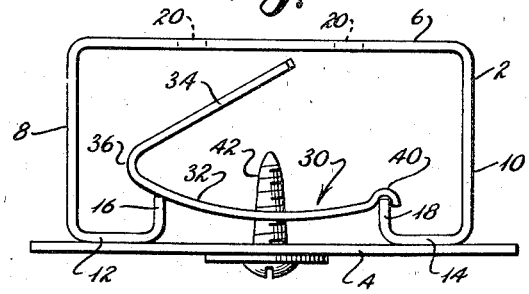
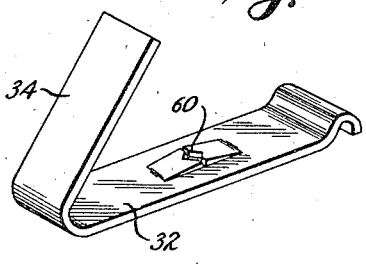
INVENTOR
Lorne C. Elder
BY Scrivener and Parker
ATTORNEYS

United States Patent Office 2,962,783
Patented Dec. 6, 1960

2,962,783

SPRING CLIP FOR CONNECTING TWO PARTS

Lorne C. Elder, Hamilton, Ontario, Canada, assignor to Associated Spring Corporation, Bristol, Conn., a corporation of Delaware Filed Feb. 19, 1958, Ser. No. 716,222

1 Claim. (Cl. 24—73)

This invention relates broadly to devices for attaching together two normally separate parts such as a channel shaped ceiling joist and an acoustic ceiling block or a lighting fixture or the like which must be supported by the joist.

It has been the particular object of this invention to provide a device for attaching together two parts or members such as those described, which device may be easily and cheaply formed of readily available spring steel stock or equivalent material, and which may be easily inserted into its operative position and quickly and easily attached to the parts to be connected. As attaching devices of the type of that provided by this invention are often connected to one or both of the parts by screws, and as such attaching devices are often in "blind" positions, it has been an important object of the invention to provide such a device which is so constructed and so co-operates with the parts being connected that turning or rotation of the device from its proper and operative position by rotation of the screw which engages it is prevented. Further, and as another feature of the invention having to do with blind insertion and attachment of a connecting device of the type of the present invention, another object has been to provide a device which includes resiliently connected parts which, when the device is assembled to the parts to be connected, resiliently bear on such parts and thus prevent accidental movement or dislodging of the device from its proper assembled position.

Other objects and features of the invention will appear from the following specification and the appended claim.

The invention is described in the following specification and illustrated in the accompanying drawing, in which:

Fig. 1 is a perspective view showing a ceiling joist, a ceiling member to be supported thereby, and a device according to the invention for connecting the two;

Fig. 2 is an end view of the parts shown in Fig. 1, but showing the connecting device in a preliminary stage of its assembly to the two members to be connected;

Fig. 3 is a view similar ot Fig. 2 but illustrating the result of over-tightening the connecting device according to the invention, and Figs. 4, 5 and 6 are perspective views showing different forms which the invention may take.

In Fig. 1 of the drawings there is illustrated a typical assembly which is to be supported as part of a ceiling or other structural member and which comprises an elongated, inverted channel shaped member 2, which may be a ceiling joist or the like and which, in modern structural practice, may be formed of metal, and a flat member 4 which may be an acoustic ceiling block, a sheet of wallboard, or the upper surface of a second channel shaped member. The channel member 2 has a bottom 6 and downwardly extending legs 8, 10 each of which is turned inwardly or transversely of the member 2, as shown at 12, 14 and then upwardly for a short distance as shown at 16, 18. The bottom 6 may have holes 20 formed therein through which bolts or screws (not shown) may be passed to attach the channel member 2 to the ceiling, the ceiling joists, or to any other structural member, and the member 4 may have holes 22 therein for a purpose to be described.

The channel member 2 is adapted and intended to support the member 2 and means are provided by the invention for connecting these two members to provide the desired support. Such means comprise a spring clip 30 which may be formed from an elongated, relatively narrow strip of spring steel or other suitable material and which is bent approximately midway between its ends at 36 to provide two legs 32, 34 which are disposed at an acute angle to each other. The leg 32, which may be referred to as the lower or base leg, is preferably straight throughout the greater part of its length and at its outer or free end is curved upwardly in the direction of the second or upper leg 34 and then downwardly to form, at its outer end, a downwardly-facing U-shaped part 40 extending entirely across the leg 30, as clearly shown in the drawings. Between its ends the lower or base leg 32 is provided with a hole 38 for a purpose to be described hereinafter.

In the use and operation of a connecting device according to the invention the channel member 2 is hung in the manner described above and it is desired to support a ceiling or other member 4 thereon, with the upper surface of such member in face-to-face engagement with the lower surfaces of the transverse parts 12, 14 of the channel member. The member 4 is temporarily supported, as by hand, in this position and one of the spring clips 30 is positioned between the members 2, 4 with the downwardly-facing U-shaped part 40 lying over and receiving the upper edge of one of the upwardly-extending walls 16, 18 of the channel member 2, the other end of the lower leg 32, adjacent the return bend 36, resting on the second upstanding wall 16 the hole 38 in the lower or base arm 32 of the spring clip being positioned above and registering with hole 22 in member 4, and the upper leg 34 of the spring clip extending upwardly or away from member 4 with its outer end in engagement with the inner surface of the bottom 6 of channel member 2. The function of the upper leg 34 at this time is very important, as by resiliently bearing on the bottom part 6 it maintains the lower leg 32 in position with its arcuate part 40 in locking position on the upper edge of the wall 18. The tension between legs 32, 34 when the end of the upper leg bears on bottom part 6 and the lower leg bears on the walls 16, 18 is sufficient to hold the clip in any position in which it is placed, but the clip may be moved longitudinally of the channel member by light tapping with the hand or a tool. A screw 42 is now passed through the hole 22 in member 4 and is threaded through hole 38 in leg 32, causing leg 32 to be bowed downwardly, as shown in Fig. 1, and tightly connecting part 4 to the channel member 2 through the intermediary of leg 32 of the spring clip. The turning movement of the screw 42 will be transmitted to the spring clip but will not be effective to turn it as the clip is locked in position by reason of the engagement of the arcuate part 40 of leg 32 over the upper edge of wall 18. The final positions of the parts are clearly shown in Fig. 3, in which it will be seen that the outer end of upper leg 34 may at this time be out of engagement with bottom part 6 of the channel member, this without adversely affecting the connecting function and operation of the spring clip. If the screw 42 is threaded too far into the lower leg 32 that leg will be drawn downwardly sufficiently to engage the upper surface of the ceiling or other member 4, after which no further turning of the screw will be possible. This action provides a safety feature preventing excessive tightening of the screw.

Figs. 4, 5 and 6 of the drawings illustrate various forms of holding devices which may be formed in the lower or base arm 32 of the spring clip. In Fig. 4 the base leg has a hole 38 formed therein which will take either a standard or self-tapping screw. The clip of Fig. 5 is provided with a machine screw or rod 50 which may be staked, welded or otherwise held in position depending from the base leg 32, by which it is meant that it extends in a direction away from the upper leg 34. The base leg of the clip illustrated in Fig. 6 is provided with a spring nut impression 60, which may be of any well-known construction and which will receive and hold an unthreaded rod, a screw or a self-tapping screw.

The upper leg 34 may be flat from end to end, as shown in Figs. 2, 3, 4 and 6, or may be curved at its end in the direction of the first leg, as shown in Fig. 5.

While I have described and illustrated various embodiments of the invention it will be apparent to those skilled in the art that other embodiments, as well as modifications of those disclosed, may be made and practised without departing in any way from the spirit or scope of the invention, for the limits of which reference must be made to the appended claim.

What is claimed is:

A spring clip for attaching a flat member to a channel shaped member of the type having a bottom, side walls extending from the opposite edges of the bottom, transverse surfaces extending inwardly of the channel shaped member from the outer edges of the side walls with an open space between them, and walls extending inwardly into the channel shaped member from the edges of the transverse surfaces, with the flat member outside the channel shaped member and in face-to-face engagement with the transverse surfaces thereof, said spring clip comprising an elongated unitary strip of flat spring steel bent transversely of its length adjacent its midpoint into substantially V-shape to provide two substantially flat legs disposed at an acute angle to each other, one of said legs having a U-shaped part opening outwardly away from the other leg and extending transversely of the leg in which it is formed at the outer extremity, the said U-shaped part terminating in the same plane as the major dimension of said leg, said one leg being of such a length that it will rest on the two inwardly extending walls of the channel shaped member with the upper edges of one of said inwardly extending walls received in the U-shaped part of said leg, the other of said legs being of such a length that it resiliently engages the inner surface of the bottom of the channel shaped member when the first leg is in the described position resting on said inwardly extending walls, and said first leg having means for attaching it to said flat member which is disposed in face-to-face engagement with the transverse surfaces of the channel shaped member and outside thereof.

References Cited in the file of this patent

UNITED STATES PATENTS

| | | |
|---|---|---|
| Re. 23,876 | Poupitch | Sept. 21, 1954 |
| 2,173,544 | Tinnerman | Sept. 19, 1939 |
| 2,318,840 | Camp | May 11, 1943 |
| 2,865,063 | Hartshorn | Dec. 23, 1958 |